June 14, 1966 R. A. EDWARDS 3,255,941
STAMP DISPENSER
Filed July 6, 1964 7 Sheets-Sheet 1
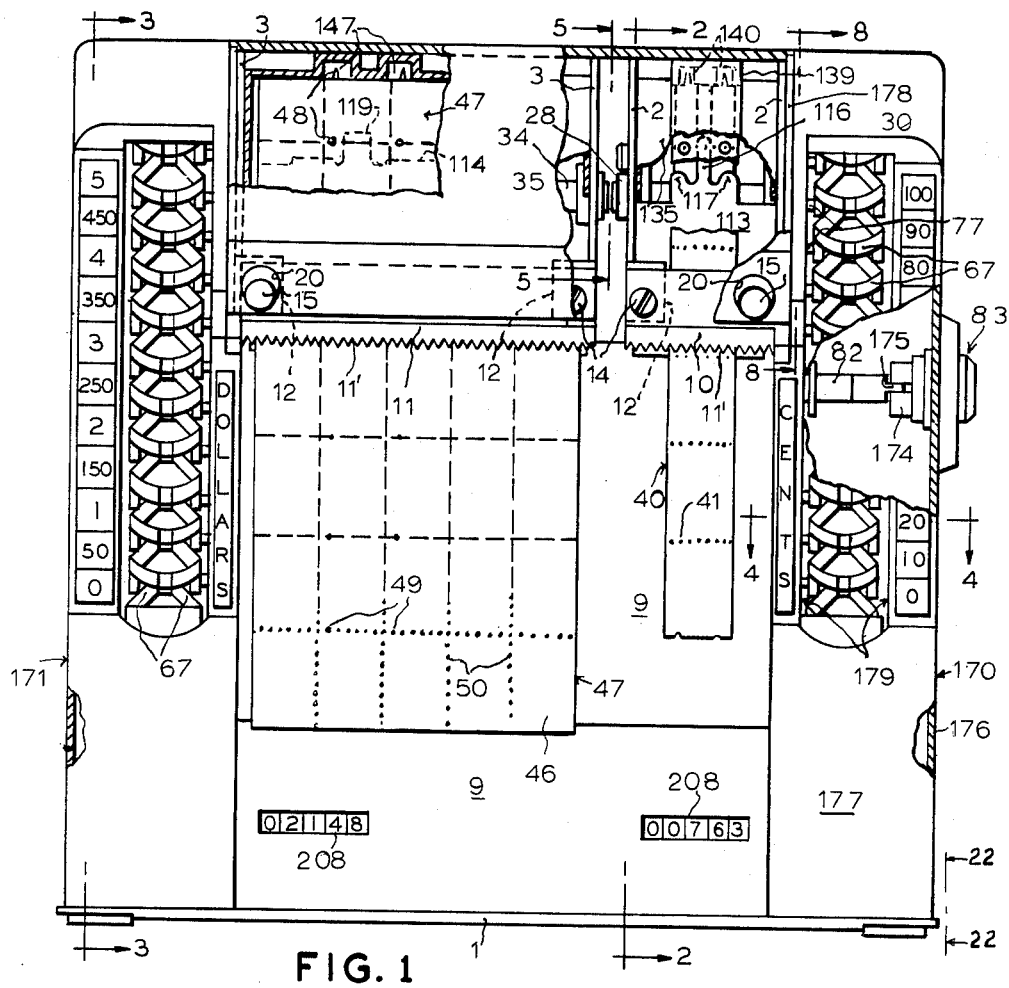
FIG. 1
FIG. 4
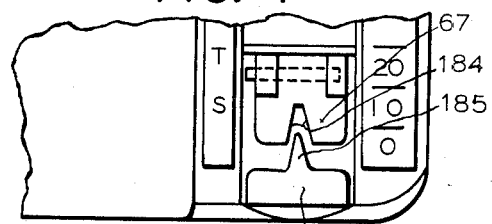
FIG. 11
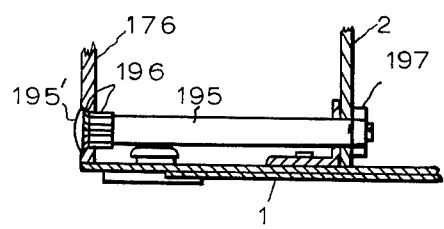
FIG. 17
INVENTOR.
Richard A. Edwards
BY
Boyken, Mohler & Foster June 14, 1966 R. A. EDWARDS 3,255,941
STAMP DISPENSER
Filed July 6, 1964 7 Sheets-Sheet 2
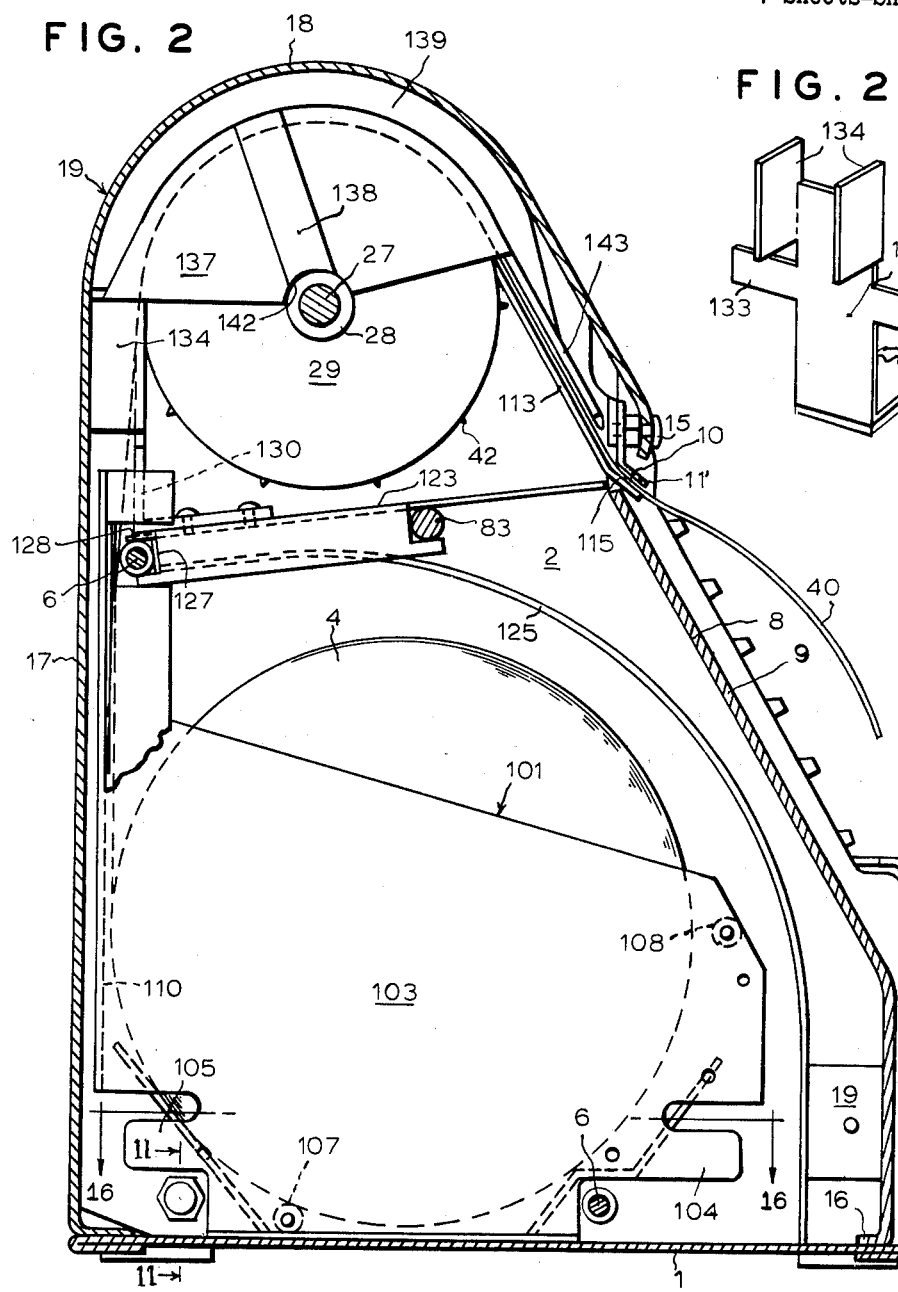
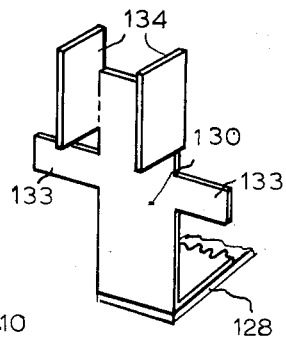
INVENTOR.
Richard A. Edwards
BY
Boyken, Mohler & Foster

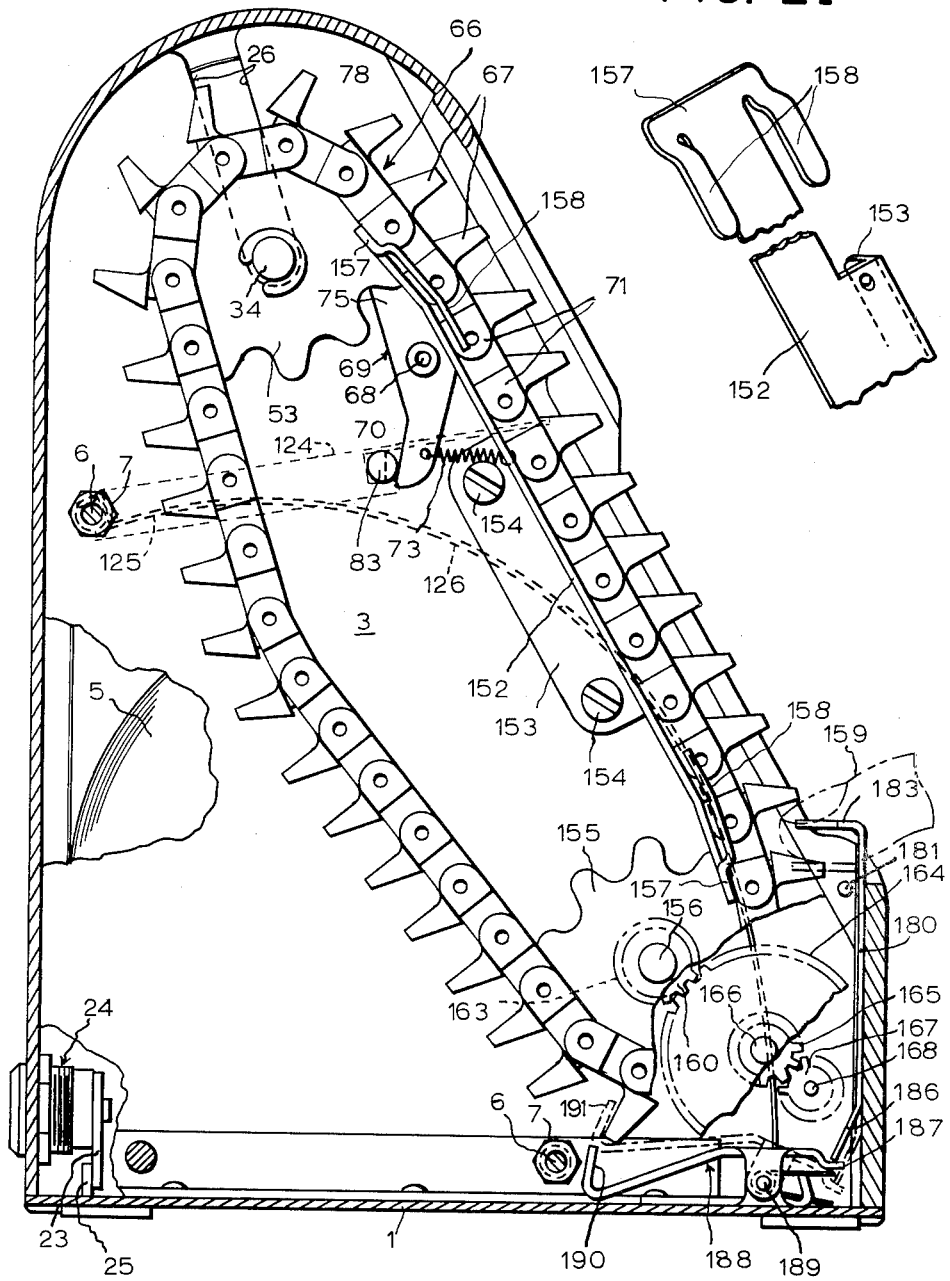

June 14, 1966  R. A. EDWARDS  3,255,941
STAMP DISPENSER

Filed July 6, 1964  7 Sheets-Sheet 4

INVENTOR.
Richard A. Edwards
BY
Boyken, Mohler & Foster

June 14, 1966  R. A. EDWARDS  3,255,941
STAMP DISPENSER
Filed July 6, 1964  7 Sheets-Sheet 5
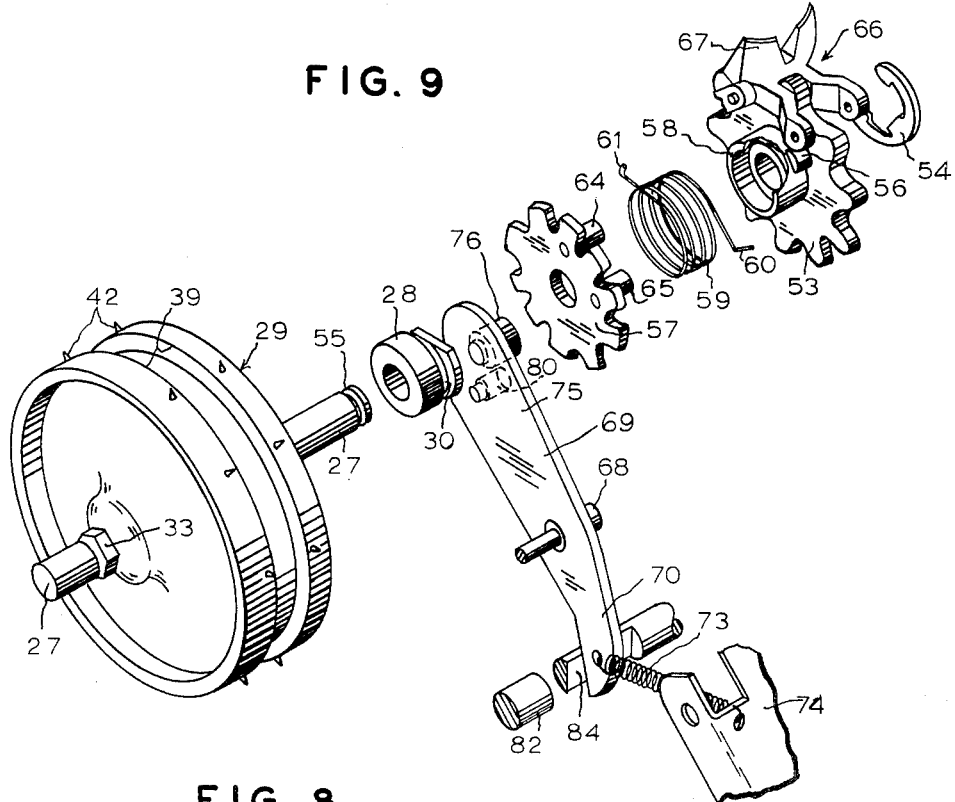
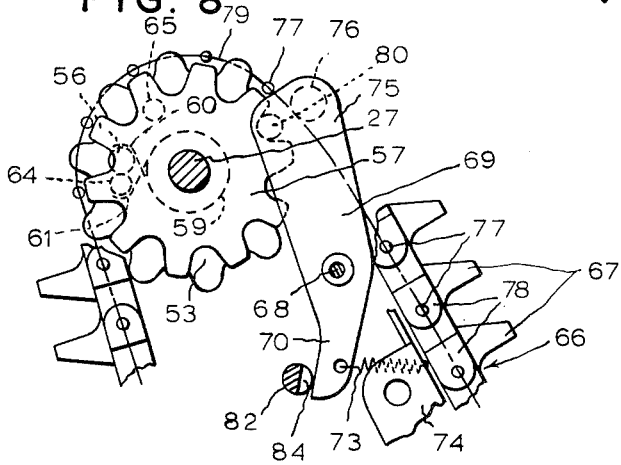
INVENTOR.
Richard A. Edwards
BY
Boyken, Mohler & Foster
Attorneys June 14, 1966  R. A. EDWARDS  3,255,941
STAMP DISPENSER Filed July 6, 1964  7 Sheets-Sheet 6

INVENTOR.
Richard A. Edwards
BY
Boyken, Mohler & Foster

June 14, 1966   R. A. EDWARDS   3,255,941
STAMP DISPENSER

Filed July 6, 1964   7 Sheets-Sheet 7

INVENTOR.
Richard A. Edwards
BY
Boykin, Mohler & Foster

United States Patent Office 3,255,941
Patented June 14, 1966

3,255,941
STAMP DISPENSER
Richard A. Edwards, Walnut Creek, Calif., assignor to Roto-Stamp Corporation, San Francisco, Calif., a corporation of California
Filed July 6, 1964, Ser. No. 380,598
15 Claims. (Cl. 226—76)

This invention is an improvement over the invention disclosed in copending application Serial No. 217,996, filed August 20, 1962, now Patent No. 3,168,230, by Wolfgang B. Fahrenbach.

One of the objects of this invention is the provision of a stamp dispensing machine that is provided with improved means for operating the machine with greater facility than heretofore.

Another object of the invention is the provision of a stamp dispensing machine that includes improved means for insuring against unauthorized access to the stamps in the machine.

An additional object is the provision of a machine that is provided with improved means for controlling the dispensing of the stamps, so that the stamps themselves cannot be manipulated to withdraw or to dispense stamps in excess of those disposed by normal operation of the machine.

Another object is the provision of improved means for locking the machine against actuation thereof.

An added object of the invention is the provision of a stamp dispensing machine that is of simpler structure and operation than heretofore and that is more economical to make.

Heretofore it has generally been considered necessary to provide a movable cutter for cutting the stamps that are dispensed from a roll thereof that is in the machine, from the roll, the latter remaining in the machine.

In the present invention no such manually or power result.

Also, it has heretofore been considered necessary in stamp dispensing machines of the general type hereinafter described, to hold down an unlocking or releasing element in order to actuate the machine, and to maintain force against such element during the actuation of the stamp dispensing mechanism, which operation not only tired the operator by adding resistance to its operation, but which operation was impossible in many instances due to interference by the fingernail on the finger actuating the machine. Also an accidental diminution of the pressure on the unlocking means during a stamp dispensing operation would interrupt the operation.

With the present invention provision is made to automatically release the stamp dispensing mechanism for the stamp dispensing operation merely upon the finger moving the stamp dispensing mechanism, and which mechanism is automatically locked against reverse movement upon the finger being released from the mechanism.

In the past, efforts have to some extent been made to prevent unauthorized acces to the roll or rolls of stamps in a machine where the stamps are of substantial value. At the present time many stores have single trading stamps that are issued upon a purchase in the amount of $1.00 and up. These stamps and others in lesser denominations, represent a substantial amount of money.

By the present invention access to the supply of trading stamps or other stamps within the machine can only be had by use of a proper key, unless the person intending to pilfer the stamps materially damages the machine, giving ample evidence of unauthorized entry therein.

Also, heretofore locking means for locking the stamp dispensing mechanism itself has been complicated and has usually involved many parts other than a lock itself, and has also operated on relatively delicate parts of the dispensing mechanism.

With the present invention the lock for the dispensing means is actuatable to prevent any effective movement of the stamp dispensing mechanism, after the lock is actuated.

Other objects and advantages will appear in the description and drawings.

In the drawings, FIG. 1 is a front view of the stamp dispensing machine, with certain parts broken away to expose internal structure.

FIG. 2 is a cross sectional view taken generally along line 2—2 of FIG. 1.

FIG. 3 is a cross sectional view taken generally along line 3—3 of FIG. 1 with certain parts broken away, and with a finger being shown in broken lines in an actuating position at the end of a stamp dispensing operation.

FIG. 4 is a fragmentary, enlarged elevational view of part of the machine of FIG. 1 as seen from line 4—4 thereof.

FIG. 5 is an end view taken between the adjacent ends of the two shafts.

FIG. 8 is a view illustrating the relative relation between parts that are shown in the exploded view in FIG. 9, but in FIG. 8 some of the parts are omitted and are not proportionally correct, in order to enable FIG. 8 to more clearly show the cooperative relation between the parts. Line 8—8 in FIG. 1 shows about the position from which the view is taken.

FIG. 9 is an exploded view of parts indicated in the assembled view of FIG. 8.

FIG. 11 is a fragmentary, cross sectional view showing one of the bolts that connects each end housing portion to the intermediate portion taken along line 11—11 of FIG. 2.

FIG. 17 is a reduced end elevation view of the lower portion of the machine.

FIG. 20 is a perspective view of a portion shown in elevation in FIG. 2.

FIG. 21 is a fragmentary perspective view of a portion of the chain guide shown in FIG. 3.

Figure 5:
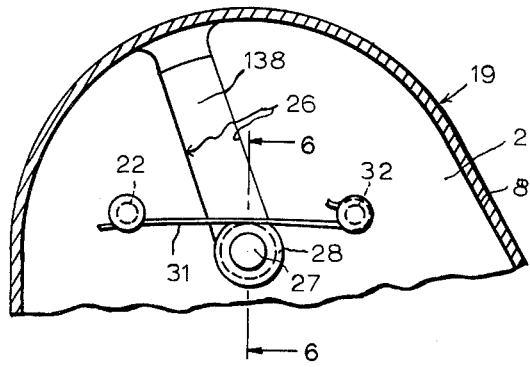
FIG. 5 is a fragmentary, cross-sectional view substantially along line 5—5 of FIG. 1.

In the device illustrated in the drawings, a horizontal base plate 1 is provided, to which is secured several pairs of horizontally spaced opposed vertical plates (FIG. 1), one pair being designated 2, and a second pair being designated 3. Disposed between the pair of plates 2 is a roll of stamps 4 (FIG. 2) while between the pair of plates 3 is a wider roll of stamps 5 (FIG. 3). All of said plates are aligned in a horizontal row. The reason for more than one pair of plates is that either the stamps of each roll are of different denominations or the roll of stamps are of different widths, or both.

It is pertinent to note, however, that while the operating mechanisms for the rolls are separate, and are similar, structurally, the arrangement of the rolls, their actuating mechanisms, and supports are such that additional rolls of stamps and operating mechanisms therefore may be readily added and the housing for them expanded, with no difficulty or redesigning.

Plates 2, 3 are held in rigid relation by being secured at their lower ends to base 1 in any suitable manner, and conventional tie bars 6 and spacer nuts 7 (FIG. 3) may secure the plates rigid relative to each other and correctly spaced apart.

Plates 2, 3 have correspondingly slanted forward edges 8 (FIG. 2), it being understood that hereafter the words "forward," "forwardly," "rear," and "rearwardly" and words of similar import are used with respect to the side of the device from which the stamps are withdrawn, which is the forward side. The slant of the forward edges of plates 2, 3 is rearward in an upward direction, commencing a short distance above the base 1, and they are arcuately curved at their upper edges, and extend vertically downward at the rear side of the machine.

The housing for some of the working parts includes a front panel 9 (FIGS. 1, 2), that terminates along a horizontal line spaced slightly above points midway between the uppermost and lowermost edges of plates 2, 3 (FIG. 3). This panel has the same inclination as the forward edges 8, and extends at its upper end below a pair of horizontal, stationary cutter bars 10, 11 (FIG. 1), each having teeth 11', or a serrated edge, projecting forwardly and in a slightly downward direction. The pair of plates 2 have inturned lugs 12 that extend toward each other (FIG. 1) to which cutter bar 10 is secured at one of its ends by a screw 14 and at its other end by a screw 15 having forwardly projecting annular head thereon, (FIGS, 1, 2). The plates 3 have similar inturned lugs and screws corresponding to screws 14, 15 secure the ends of cutter bar 11 thereto, with the screws 14 at the adjacent ends of bars 10, 11. The side edges of the panel 9 extend over and slightly past edges of plates 2, 3 but terminate along said edges. This panel 9 has a rearwardly projecting flange 16 (FIG. 2) along its lower edge that is rigidly secured to base 1 by spot welding or in any other suitable manner by which it cannot be removed.

The housing for the working parts that are positioned between the pairs of plates 2, 3 further included a removable section having vertical rear panel 17 (FIG. 2) provided with a curved upper portion 18 that is adapted to extend over the curved upper edges of plates 2, 3 to a position in lapping relation to upper portions of the cutter bars 10, 11 and above the cutting edges of the bar. The rear panel 17 and upper portion 18 thereof may be termed the central section of the housing and it is generally designated 19.

The central section 19 of the housing is removable, while the front panel 9 is rigid, and is formed with openings 20 in the forward marginal portion thereof. Said forward marginal portion extends over upper portions of the cutter bars (FIG. 1) and over the screws 14, and the heads of screws 15 are adapted to freely pass through openings 20. The lower edge of the forward marginal portion terminates above the upper edge of panel 9. Upon positioning the central portion so the heads of screws 15 pass through openings 20 the remainder is then swung downwardly so the curved upper part of said central portion extends over and against the upper curved edges of plates 2, 3 and the rear part 17 is vertical. A key operated latch 23 is carried by lock 24, that, in turn is secured to the lower marginal portion of said part 17 and when wall 17 is vertical it will be in a position for the latch to rotate to a position against the forward side of an upstanding lug 25 that is rigid with said base 1. Upon rotating the removable key for lock 24, the latch will rotate to engage said lug 25 and the central section can then be removed only by use of the key. Thus, everything between the endmost plates 2, 3 that are outermost of the two pairs thereof, will be inaccessible to a person when the central portion is locked in place.

The upper portions of plates 2, 3 are formed with upwardly opening corresponding slots 26 (FIG. 5) that extend downwardly and forwardly relative to the upper edges of said plates.

Figure 6:
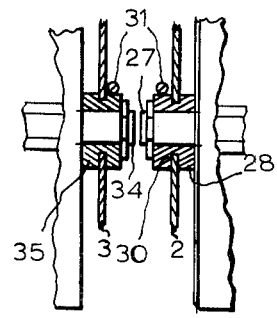
FIG. 6 is an enlarged, fragmentary, cross sectional view of the adjacent ends of the shafts carrying the drums over which the rows of stamps are adapted to extend. Line 6—6 of FIG. 5 is the position of the section line but in FIG. 5 the end of only one of the shafts is shown since

A horizontal shaft 27 (FIGS. 5, 6) carries a pair of bearings 28, each being formed with an annular groove, and a cylindrical drum 29 (FIG. 9) is secured on said shaft between said bearings. Said bearings are each formed with an annular, outwardly opening groove 30 (FIGS. 6, 9) adapted to slidably receive the opposed edges of each slot 26. Thus, the lower ends of the slots 26 in plates 2 will support the bearings 28 with the drum 29 disposed between said bearings. The shaft 27 may be polysided in the portion 33 (FIG. 9) on which the drum is held and which drum has a central opening of complementary cross sectional contour in which the portion 33 of the shaft is fitted to secure the shaft and drum for rotation together.

A shaft 34 (FIGS. 1, 6, 7) having bearing 35 (FIGS. 1, 6) thereon, that correspond to bearings 28, is supported by plates 3 in axial alignment with the shaft 27. A drum 36 is secured on shaft 34 in a position between plates 3 in the same manner as drum 29 is secured on shaft 27, the latter having a polysided portion 37 (FIG. 7) that fits into a corresponding complementary sided opening in the hub 38 on drum 36.

The shoulders at the ends of the polysided portions 33, 37 function as stops engageable with bearings 28, 35 to prevent objectionable axial movement of the shafts 27, 34.

The portions of bearings 28, 35 that project outwardly of the respective pairs of plates 2, 3 each have a flat upper side (FIG. 5) that is yieldably engaged by a spring arm 31 for yieldably holding the bearings at the lower ends of slots 26, and to prevent rotation of the bearings in the slots. One end of each spring arm 31 is connected to a projection 32 rigid on each plate 2, 3 at one side of the adjacent bearing for each shaft and said arm extends over and in engagement with the flat upper side of the outwardly projecting portion of each bearing 28, 35, and then under a projection 22 at the opposite side of each bearing that may be of the same structure as projection 32. These projections are headed to prevent accidental release from projections 32, 22, but the end of each arm 31 extending below each projection 22 may be sprung from below the latter to free the bearings 28, 35 for removal of the shafts, bearings, and drums.

Referring specifically to drum 29 (FIG. 9) the same may be of any suitable material, and is preferably cast to provide an outwardly facing outer peripheral cylindrical surface with a central, outwardly opening annular groove 39 provided therein. The width of the drum 29 at its outer surface is equal to the width of the strip of stamps (FIG. 1) that is adapted to extend over said drum, and which strip comprises a single file of stamps. The strip 40 is formed with equally spaced rows of perforations 41 extending transversely of the strip.

The drum 29 is provided with two rows of equally spaced radially outwardly directed pins 42, which rows extend circumferentially of the drum and are positioned, transversely of said drum, to engage spaced holes 41 in strip 40 when the latter extends over the drums, as will later be explained more in detail. These pins are cylindrical in cross sectional contour and their sides taper to a point in a direction outwardly of the surface of the drum, and said rows are adjacent to opposite sides of the groove 39.

Figure 7:
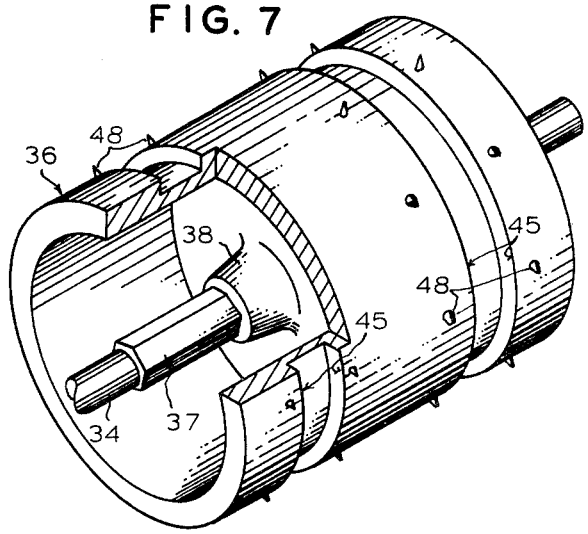
FIG. 7 is a perspective view of one of the stamp dispensing drums, partially broken away and in cross section.

Drum 36, as seen in FIG. 7, is five times wider than the drum 29, and is formed with a pair of outwardly opening grooves 45, each of which may be slightly wider than groove 39, and each of these grooves is spaced from each end of the drum slightly less than the width of each stamp 46 in the five-wide strip 47 (FIG. 1) that is adapted to extend over the drum. A row of pins 48 corresponding to the pins 42 is positioned adjacent to each side of each of the grooves 45, and these pins are adapted to extend through one of the openings 49 (FIG. 1) in the transverse rows of openings defining the ends of the stamps 46 in each transverse row thereof on the strip 47, which strip is five stamps wide. The sides of the adjacent pairs of stamps 46 in strip 47 are defined by rows of openings 50 extending longitudinally of the strip 47, and pins 48 are positioned to extend through openings 49 that are offset to one side of the longitudinally extending rows of openings 50. This arrangement of the pins relative to the stamps precludes accidental stripping of the stamps along the rows of perforations 50 in the operation of the machine, due to a violent actuation thereof or an intentional withdrawal of stamps by pulling on the strips of stamps, were the pins in the perforations 50.

The following description relative to shaft 27 and parts associated therewith is the same as for shaft 34, hence the description will not be duplicated where unnecessary.

FIG. 8 is somewhat schematic in that the parts illustrated therein are outwardly of the right hand plate 2 of FIG. 1 and the view would be generally along line 8—8 of FIG. 1. However, the actual proportions are not necessarily exact and some parts are broken away and eliminated in order to more clearly show the functional coaction between elements. In the exploded view of FIG. 9 the complete set of elements on shaft 27 are shown. The same elements are on shaft 34 at the other end of the machine, and in reverse order to those shown in FIG. 9.

In FIG. 8, the right hand end portion of shaft 27 that projects outwardly of plate 2, as seen in FIG. 1, is shown. The drum 29 that is between the pair of plates 2, is secured on said shaft, as has hereinbefore been described.

Sprocket wheel 53 is rotatably secured on the end portion of shaft 27, shown in FIG. 9, and is held against axial movement off the end of said shaft by a conventional spring keeper 54 (FIG. 9) that is adapted to snap into an annular outwardly opening groove 55 formed in the outer end of shaft 27. The inner side of sprocket wheel 53 is the side facing the adjacent wall or plate 2 and a lug 56 (FIGS. 8, 9) rigid with said sprocket wheel projects from the inner side of said wheel and toward an escapement wheel 57 that, in turn, is rigid on shaft 27.

Concentric with, but spaced radially outwardly of the shaft 27, the sprocket wheel 53 is formed with a cylindrical boss 58 (FIG. 9). Lug 56 is radially outwardly of boss 58, but adjacent thereto. A torsion spring 59 (FIGS. 8, 9) is around boss 58, one end 60 of which is connected with sprocket 53 while the opposite end 61 of said spring is connected with wheel 57.

Rigid with the wheel 57 are a pair of axial projections 64, 65 that are spaced from each other circumferentially of wheel 57 and between which projections the lug 56 extends.

Spring 59 is arranged so that a clockwise rotation of the sprocket wheel 53 will progressively tension spring 59 in a direction for rotating wheel 57 in the same direction, but which spring will also yieldably hold the lug 56 against the trailing projection 64 and spaced from the leading projection 65, the latter being spaced from projection 64 in a clockwise direction as seen in FIG. 8. The words "leading" and "trailing" are used with respect to the direction of rotation of the sprocket wheel and the escapement wheel 57, and consequently the direction in which projections 64 will be moved.

A sprocket chain, generally designated 66, extends over the sprocket wheel 53 and each link 71 of the chain includes a finger engageable element 67 (FIG. 3), which will later be described in more detail, but which element is adapted to be engaged by a finger of the hand for moving the chain 66 in a direction to rotate sprocket wheel 53, as seen in FIGS. 3, 8, and 9, in a clockwise direction.

A pivot 68 pivotally supports a lever 69 (FIGS. 8, 9) on plate 2 between the latter and sprocket wheel 53. FIG. 3 shows a corresponding lever that is supported on plate 3 at the left hand end of the machine as shown in FIG. 1, which is associated with the drum actuating elements for drum 36, each of which is the same as the ones now described for drum 29, except that they are on shaft 34. The parts associated therewith will have the same numbers as in FIGS. 8, 9 unless otherwise stated.

Referring back to FIGS. 8, 9, the lower portion 70 of lever 69 is below pivot 68, and is connected with one end of a helical spring 73. The opposite end of said spring is connected with any stationary part of the machine. In FIGS. 8, 9 it is shown as being connected with chain support 74 that, in turn, is rigid with the plate 2 that is adjacent thereto. In FIG. 3 it is connected with a corresponding plate 152. Spring 73 is tensioned to yieldably urge the upper portion 75 of lever 69 counter-clockwise, as seen in FIG. 8 and which upper end is forwardly relative to shaft 27.

The upper end 75 of lever 69 carries a projection 76 (FIGS. 8, 9) that projects laterally therefrom in a direction toward sprocket wheel 53, and across the path of travel of axial cylindrical extensions 77 (FIG. 1) on the pins 78 or pivots that connect the adjacent pairs of links 78 of the endless chain 66. The projection 76 has a cylindrical outer surface that is adapted to be engaged by the axial cylindrical extension 77 of each of the pins 78 when the chain 66 is actuated to rotate sprocket wheel 53 clockwise. In FIG. 8 the extensions 77 on the link connecting pivots are indicated separate from the links of chain 66 where they extend around the sprocket wheel, and their path of travel is indicated in dot-dash line 79. The extensions 77 will engage the cylindrical face of projection 76 at a point slightly below the axis of said projection, thus camming the projection outwardly of the axis of shaft 27 and swinging the upper end 75 of lever 69 clockwise against the tension of spring 73, as long as the lower end 70 of lever 69 is free to swing clockwise.

Also rigid on the upper end portion 75 of lever 69 is a lateral cylindrical member 80 that projects to the same side of lever 69 as projection 76. This member 80 is adapted to be swung between any of the adjacent pairs of teeth on the escapement wheel 57 opposite thereto, and is positioned between one of such adjacent pairs when the upper end of lever 69 is swung to a position between an adjacent pair of extensions 77.

When the chain 66 is actuated by a finger engaging one of the elements 67 on a link 71 of said chain to move the sprocket wheel clockwise, as seen in FIG. 8, the force applied is immediately transferred through spring 59 to the escapement wheel 57 and thereafter the extension 77 of the adjacent link pin 78 will engage the projection 76 to swing the upper end 75 of lever 69 to lift the member 80 from between an adjacent pair of teeth on the escapement wheel in which the member 80 was positioned thereby permitting the movement of the chain to effect rotation of the shaft 27, and the drum 29 secured therein, clockwise. But unless the chain 66 is actuated the drum 27 cannot be rotated due to the member 80 being automatically moved under the influence of spring 73 to between a pair of adjacent teeth on the escapement wheel as soon as the chain 66 stops.

The leading projection 65 of the projection 64, 65 will be engaged by the lug 56 during rotation of the sprocket wheel, and instantly upon the chain 66 stopping, the torsion spring 59 will restore the escapement wheel and the sprocket wheel to their original positions relative to each other.

The member 80 will, during movement of the chain, move successively into the space between each successive pair of adjacent teeth on the escapement wheel, under the influence of spring 73, and the outer corners of the teeth of said escapement wheel are preferably rounded to facilitate the movement of the member 80 to between said teeth.

Torsion spring 59 functions as a shock absorber to prevent breaking or tearing the strip 40 of stamps on drum 29, and its energy is also transmitted to the drum 29 to effect a rapid passage of the teeth of the escapement wheel to the successive positions in which the member 80 is moved to its position between the teeth of said wheel. The member 80 will always move to between a pair of teeth on the escapement wheel whenever the movement of the chain 66 ceases, and when in this position the drum 29 can only be operated to dispense stamps by actuation of the chain. A pull on the strip of stamps will be ineffective to rotate the drum, and chain 66 cannot be moved to rotate the drum counterclockwise since the projection 76 on the lever 69 cannot be actuated to cause the lever to swing for withdrawing member 80 from between the teeth on the escapement wheel 57 because there is not sufficient movement between the lug 56 and the trailing projections 64 to permit the extension 77 on the pin 78 that has moved past the projection 76 to effect lifting of member 80 from between the teeth of the escapement wheel. In other words, the member 80 positively locks the escapement wheel, which, in turn, is rigid with drum 29, against reverse movement of the escapement wheel unless the sprocket wheel can rotate counterclockwise, as seen in FIG. 8, and it cannot move counterclockwise since lug 56 is against the element 64 that is rigid with the escapement wheel.

It has been mentioned that the chain 66 may be actuated to rotate shaft 27 and drum 29 provided the lever 69 is free to swing so that the cylindrical member 80 will be moved from between the teeth of the escapement wheel 57. The locking of the shaft 27 and drum 29, as well as shaft 34 and drum 36, is accomplished by means of a rod 82 that is rotatably supported by plates 2, 3 and that extends through said plates and across the rear edges of the lever 69 that are outwardly of the end plates 2, 3 of the two pairs thereof. FIG. 3 shows the end of rod 82 where it projects beyond the plate 3 at the left end of the machine as seen in FIG. 3, while at the right hand end of the machine (FIG. 1), the rod 82 connects with key actuated lock 83. Rod 82 is formed with a recess 84 in one side where the rod passes across the rear edge of the lower portion 70 of each lever 69. When the rod is in the unlocked position the recesses 84 respectively face the rear edge of each lever and the lever is free to swing, but when the key in lock 83 is rotated so that the body of the rod at the opposite side of said recess is opposed to the rear edges of said portions 70 of levers 69, the swinging of the levers is obstructed, and the members 80 will be held between the teeth of the escapement wheels to prevent rotation of said wheels, and consequently, the shafts 27, 34 and drums 29, 36 are locked against rotation. Thus, a simple rotation of a rod locks all of the drums against rotation, and until the rod is rotated to the unlocked position, the drum cannot be rotated.

Figure 10:
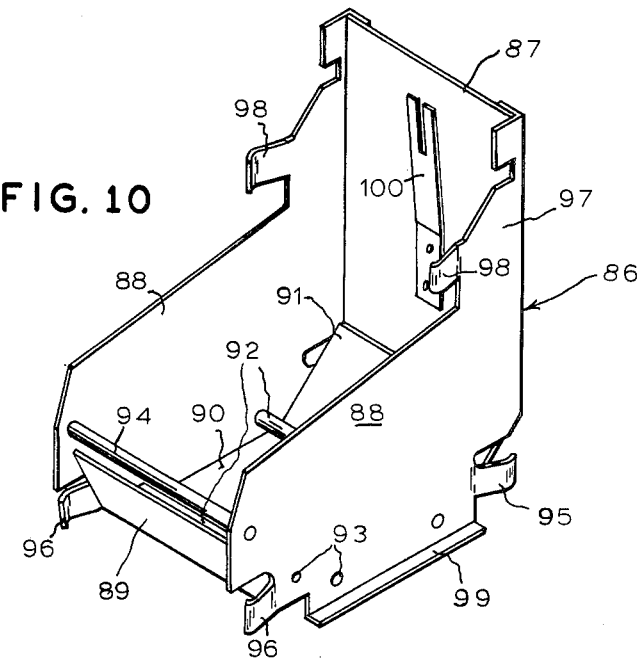
FIG. 10 is an isometric view of one of the holders for a roll of stamps, as seen from the open side of the holder.
Figure 16:
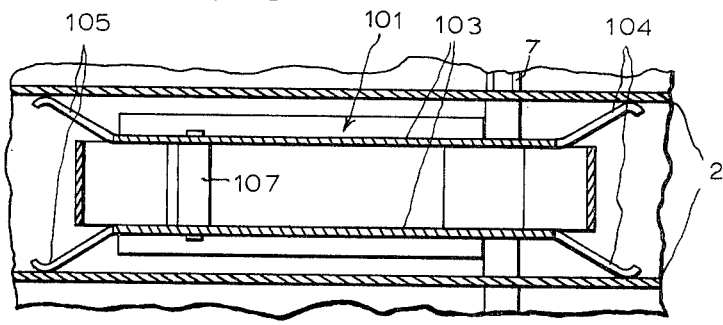
FIG. 16 is a fragmentary, cross sectional view taken along line 16—16 of FIG. 2, through the lower portion of the stamp holding receptacle for the narrow, single file, roll of stamps.

FIG. 10, which is an isometric view of the means for holding the roll 5 (FIG. 3) of stamps 47, is of the same structure as the means for holding the roll 4 (FIG. 2) of stamps 40, except that it is wider than the holder for the latter stamps.

Holder 86 comprises a rear vertical wall 87, a pair of spaced, opposed vertical side walls 88, a front wall 89, and a bottom wall 90.

Rear wall 87 has a forwardly and downwardly inclined lower section 91 that extends from the upper vertical portion of wall 87 to the horizontal bottom wall 90, meeting the latter at a point spaced forwardly of said vertical portion.

A pair of parallel, horizontal rollers 92 extend between and are rotatably supported at their ends on side walls 88 and are spaced slightly above the bottom wall 90 adjacent to the ends thereof for supporting the roll 5 of stamps 47. Spaced above and forwardly of the forward roller 92 of the pair thereof is a roller corresponding to each of the rollers 92.

The near ends of the forward roller 92 and the roller that is spaced thereabove are seen in FIG. 10, said ends being indicated at 93.

The front wall 89 of holder 86 extends slantingly upwardly and forwardly from the front edge of bottom wall 90 and terminates at about the same level as the upper edge of the inclined section 91 of the rear wall. A horizontal cross bar 94 extends between and is secured at its ends to side walls 88, which cross bar is spaced slightly above the level of the upper edge of said front wall 89.

The lower corners of the side walls 88 along their rear edges are cut away and formed with ears 95 that extend rearwardly and oppositely outwardly of the pair of side walls to function as positioning means for positioning the holder centrally spaced between the pair of plates 3, and similar ears 96 extend forwardly relative to the forward edges of walls 88 and oppositely outwardly, to position the forward end of the roll holder between plates 3.

The rear wall 87 projects much higher than the front wall 90, and relatively narrow, forwardly directed flanges 97 of walls 88 extend along the upper portion of rear wall 87. These flanges function as guides between which the strip 47 is guided, and they also have laterally, outwardly and forwardly projecting ears 98 that slidably engage plates 3 to cooperate with ears 95, 96 for correctly positioning the holder and the roll of stamps therein, relative to the drum 36 thereover.

The outer ends of ears 95, 96, 98 are curved in horizontal planes so the outer ends of the opposed pairs thereof will extend toward each other to thereby facilitate insertion of the holder into the machine when the removable central section of the housing is removed, and oppositely outwardly directed horizontal flanges 99 on the lower ends of said walls 88 slidably support the holder on the bottom wall or base 1 of the machine.

To load the holder 86, the latter is moved rearwardly out of the machine, when the removably central section of the housing is removed, and the roll 43 is then dropped into the holder so that the strip of stamps thereof will be drawn upwardly from the rear side of the roll to successively pass over the rear and top sides of the drum 36.

A vertically extending leaf spring 100 is secured at its lower end against the inner or forward side of the rear wall 87 and its upper end is sprung forwardly to lightly engage the rear side of the vertically upwardly extending portion of strip 47 where it extends from the roll to the drum. The upper end portion of said strip is in a position opposed to a connecting rod 6 that extends between and connects the pair of opposed plates 3 adjacent to the rear edge of the latter. Thus said strip 47 will extend between said spring and said rod, and is positioned to be between the central pair of annular rows of pins 48 on drum 36.

The roll 4 of stamps 40 is held in the narrow holder 101, which is shown in position within the central housing section 19. This holder is between plates 2 and is of substantially the same structure as holder 86 except that it is of sufficient width to freely support and hold the narrow roll of stamps only, instead of the wide roll in holder 86.

The opposed side walls 103 of holder 101 have ears 104 and 105 and 106 that correspond to ears 94, 95 and 98, respectively. Roller 107 (FIG. 2) corresponds, in position, to roller 92 of FIG. 10, while the only other roller in holder 101 is roller 108 that is carried by the forward end portions of side walls 103 at substantialy the same position as cross bar 94 in FIG. 10. Ears 104 and 105 have the same functions as ears 96 and 95. A spring, not shown, similar to spring 100 is secured to the rear wall 110 of holder 101 and performs the same function with respect to strip 40 as spring 100 does with respect to strip 47.

The strips 40 and 47 from rolls 4, 5 extend upwardly from the rear sides of said rolls and over drums 29, 36, respectively with the pins 42, 48 projecting through perforations 41, 49 in strips 40, 47, respectively.

From the upper sides of drums 29, 36 the strips of stamps respectively extend downwardly over guide plates 113, 114 that are respectively secured at their ends to plates 2 and plates 3 (FIGS. 1, 2).

The guide plate 113 extends between plates 2 and extends slantingly downwardly and forwardly from the front side of drum 29 substantially parallel with, and spaced below the front portion of the removable central section 19 of the housing. The lower marginal portion 115 (FIG. 2) of the guide plate 113 is spaced below and parallel with the cutter bar 10, and said marginal portion extends over the upper edge of the fixed front panel 9 of the housing.

Figure 12:
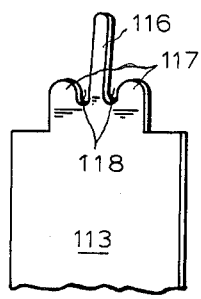
FIG. 12 is an enlarged end portion of a stamp guide for insuring release of the strip of stamps from one of the rollers over which the strips extend.

The upper end of plate 113 is formed with an upwardly extending tongue 116 (FIGS. 1, 12) that projects into the central groove 39 in drum 29, and alongside this tongue are relatively short projections 117 that extend close to the front cylindrical surface of drum 29 at points outwardly of the pair of annular rows of pins 42, there being upwardly opening recesses 118 (FIG. 12) in said guide plates between said tongue and projections 117 to pass the pins 42 as the drum is revolved clockwise as seen in FIG. 2.

By this structure the plate 113 functions as a guide plate over which the stamps move over the lower marginal portion 115 of guide plate 113 and below the cutter bar 10 for ejection from the machine, and tongue 116 and projections 117 function as strippers to insure the stamps being stripped off the pins 42.

The guide plate 114 performs the same function as guide plate 113. It is sufficiently wide to extend under the wide strip of stamps 47, and said guide plate 114 includes a lower marginal portion (not shown) that is below the cutter bar 11 and that extends between the plates 3, to which the guide plate 114 is secured, in the same manner as plate 113.

Figure 13:
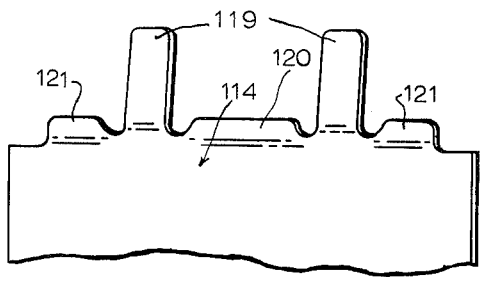
FIG. 13 is a view similar to that of FIG. 12 for stripping for strip of stamps from the wider drum of FIG. 7.

An upwardly extending pair of tongues 119 (FIG. 13) project into the pair of grooves 45 in drum 36. A horizontally elongated projection 120 is between tongues 119 and extends between the pair of annular rows of pins 48 on drum 36 that are nearest the center of the drum, while similarly projecting projections 121 are positioned adjacent to the ends of the drum and outwardly of the end rows of pins 48.

A horizontally disposed partition 123 is rigidly supported by and extends between vertical partition walls or plates 2, and a similar partition 124 is rigidly supported by and extends between and to the vertical partition walls or plates 3. Partitions 123, 124 extend over the tie-bars 6 that connect the plates 2, 3 adjacent to the rear edges of said plates (FIGS. 2, 3) and over the locking rod 83, to the forward side of the machine, and extend slantingly downwardly and rearwardly; thus functioning to prevent dust and fibrous particles from the strips of stamps extending thereover from falling onto the rolls of stamps and into the holders for the latter.

Extending from the connecting tie-bars 6 and from the lower forward portion of the housing are spring plates 125, 126 that are bowed to respectively extend over the rolls of stamps 4, 5 (FIGS. 2, 3). The forward marginal portions of said spring plates 125 are each formed with an upwardly projecting flange 127 that abuts the forward side of each tie-bar 6, and the upper marginal portion of each flange 127 is bent forwardly at 128 (FIG. 2) to extend between partitions 123, 124 above each tie-bar. The lower forward end of each spring plate abuts the rear wall of a plate extending across the rear side of a conventional counter mechanism that is adjacent to the lower marginal portion of the rigid front panel 9. The curvature of each spring plate generally conforms to the curvature of the roll of stamps therebelow when each spring plate is sprung into position so that the flange 127 of each plate abuts the forward face of each tie-bar. Thus the spring plates have smooth, concavely extending lower surfaces that may slidably engage the rolls 5, 4 should the strips be violently drawn from the machine, but they also may function as a secondary partition below each partition 123, 124.

The rear end portion 128 of partition 123 is provided with a vertically upwardly extending guide 130 (FIG. 20) against which the rear side of the strip 40 is adapted to pass to drum 29. This guide 130 has laterally outwardly extending projections 133 thereon that are adapted to extend substantially to plates 2 for centering the guide between said plates, and spaced opposed rearward projections 134 are adapted to prevent objectionable lateral movement of the strip of stamps 40 that is adapted to pass between projections 134 on the way to the drum. Said projections extend rearwardly substantially to the rear panel 17 of the central section of the housing.

One of the features of the invention is the provision of simple hold-down means for holding each of the strips of stamps 40, 47 on the drums 29, 36 so they will not slip off the pins 42, 48 where the strips pass over said drums.

Figure 15:
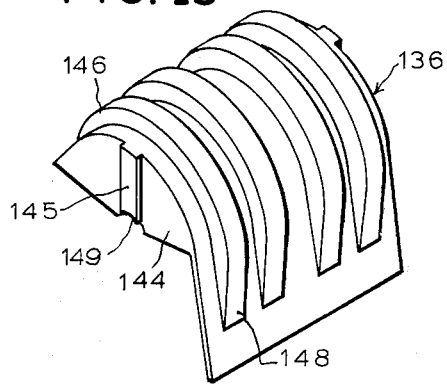
FIG. 15 is a view similar to that of FIG. 14 showing the stamp retaining element that is adapted to fit over the wider drum shown in FIG. 7.
Figure 14:
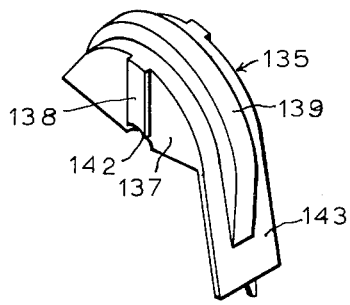
FIG. 14 is an isometric view of one of the stamp retaining adapted to fit over the drum of FIG. 9.

The two hold-down devices are similar, as seen in FIGS. 14, 15, the hold-down device for the narrow drum 29 being generally designated 135 (FIG. 14) and the one for drum 36 being generally designated 136 (FIG. 15).

Hold-down device 135 comprises a gravity held hollow substantially semi-cylindrical body, which may be of cast pot metal, so as to give it sufficient weight to resist upward movement under any upward force that might be applied thereto, after it is in place.

The hold-down 135 has spaced, opposed vertical side walls 137 each having a generally vertically extending ridge 138 formed on the outer side thereof adapted to be slidably received in the upwardly opening slots 26 formed in the upper portion of plates 2. These ridges are slightly inclined relative to vertical to the same inclination as said slots 26.

The cylindrical portion of the hold-down extending between and integral with the semi-circular edges of the hold-down is formed with a central, radially outwardly projecting semi-circular ridge 139, which is formed on its radially inwardly facing surface with a pair of radially inwardly opening grooves 140 (FIG. 1) into which the projecting pins 42 of the drum 29 are adapted to extend upon rotation of the drum. The radially inwardly facing surface of the circularly extending cylindrical portion of the hold-down at opposite sides of grooves 140 come close to the strip of stamps 40, but do not ride on the stamps, nor do the pin 42 engage the hold-down. The latter is supported on the portions of stationary bearings 28 that are between plates 2 and the ends of drum 27, said side walls 137 having downwardly opening semi-circular central recesses 142 that are complementary to the cylindrical outer surfaces of the bearings 28 and that receives aid bearings therein (FIG. 14).

The forward end of the cylindrical portion of the hold-down, projects downwardly and forwardly past the side walls 1137, to form an extension 143, the lower end of which extends below the part of the cutter bar 10 through which screws 14, 15 extend, while the opposite or rear end of the cylindrical portion terminates at about the upper end of the upward extension 129 of the rear wall of the holder 101 for roll 4. The cylindrical outer surface of the flat ridge 139 may extend to the curved upper portion 18 of the central section 19 of the housing.

The wider hold-down 136 that extends over drum 36, has the same structure as hold-down 135 insofar as the end walls 144 are concerned, each end wall being formed with a ridge 145 extending generally vertically for being slidably received in the upwardly opening slots in plates 3. A ridge 146 is formed on the cylindrically extending portion of the hold-down in each of which an inwardly opening groove 147 (FIG. 1) corresponding to grooves 140 in hold-down 135 for receiving pins 48, and the forwardly and downwardly projecting extension 148 extends to a point behind the portion of cutter bar 11 through which screws 14, 15 extend.

The recesses 149 formed in the lower edges of walls 144 receive the portions of bearings 35 that are between the plates 3 and the ends of drum 36 so that the hold-down is supported on said bearings.

These hold-downs 135, 136 are readily slipped out of the slots 26 thus exposing the drums 29, 36 for positioning the strips 40, 47 of stamps over the drums with the pins 42, 48 properly extending through the openings punched in the stamps, after which the ends of the strips are passed through the spaces between cutter bars 10, 11 and the lower portion of guide plates 113, 114. Then the hold-downs are dropped back in place and there is no possibility of the strips being jammed or displaced.

The chains 66 adjacent to the oppositely outwardly facing sides of the rows of plates 2, 3 extend, as has been described, over the sprocket wheels 53 that are identical, and one of which is on the outer end of shaft 27, while the other (FIG. 3) is on the other end of shaft 34.

The structure shown in FIG. 3 will be described in detail, and it is identical with the structure at the opposite end of the machine, except at the opposite end of the machine the end plate 2 and shaft 27 would substitute for end plate 3 and shaft 34 of FIG. 3. These in themselves are the same, structurally.

On end plate 3, along the forwardly inclined edge thereof, is an elongated flat, rigid strip 152 having a flange 153 that is secured by screws 154 to said end plate. The flat upper side of said strip 152 constitutes a rigid chain support over which substantially the full length of the upper run of said chain slidably extends. The chain support on end plate 2 is the same.

The lower end of endless chain 66 extends over a lower sprocket wheel 155 that is an idler wheel, and which wheel is rotatable on a horizontal stub shaft 156 that, in turn, is secured at one end to the adjacent plate 3.

The upper and lower end portions of the chain supporting strips 152 are each formed with an end lip 157 (FIG. 21) over which the chain passes when it moves onto the strip at the upper end of strip 152 at sprocket wheel 124 and off the latter to pass onto sprocket wheel 155.

Parallel side marginal portions 158 are stamped from the upper and lower ends of each strip and connected at one of their corresponding ends to the ends of lips 157. These are offset to the generally forwardly facing side of each strip to provide spaced guides between which the links of the chain 66 extend (FIG. 3).

The central part of each chain support extending between the opposite end portions thereof is straight and is disposed in a position offset slightly forwardly of a straight line extending between corresponding links at the same side of sprocket wheels 53, 155, so that the finger actuatable elements 67 on the links will be in a straight line along the forward part of the machine, and more readily accessible to the operator, than were the strip 152 omitted and the chain drawn taut. However, strip 152 provides a rigid support for the portion of the chain that is engaged by the finger of the operator. The operating finger 159 (FIG. 3) cannot reach the plate 152 since one of the correspondingly positioned end portions 67 (FIG. 1) of each link 71 extends convergently to the next link to preclude the finger from reaching the plate. This is a desirable feature, in that it prevents the finger 159 or the nail thereon from scraping or sliding on plate 152, and the projecting portions 67 are relatively long so as to provide an ample and smooth surface for engagement by finger 159.

A pinion 160 (FIG. 3) between sprocket wheel 155 and plate 3 is connected with said sprocket wheel for rotation therewith, and the teeth of this pinion are in mesh with the teeth on a gear 164 secured on a shaft 166. Gear 164 and a gear 165 are concentric on a stub shaft 166 carried by adjacent plate 3, and the gear 165 is in mesh with a pinion 167 that, in turn, is secured on a shaft 168 that rotatably extends through plate 3 to drive the conventional counter wheels in a counter mechanism, such as indicated at 19 (FIG. 2).

Figure 18:
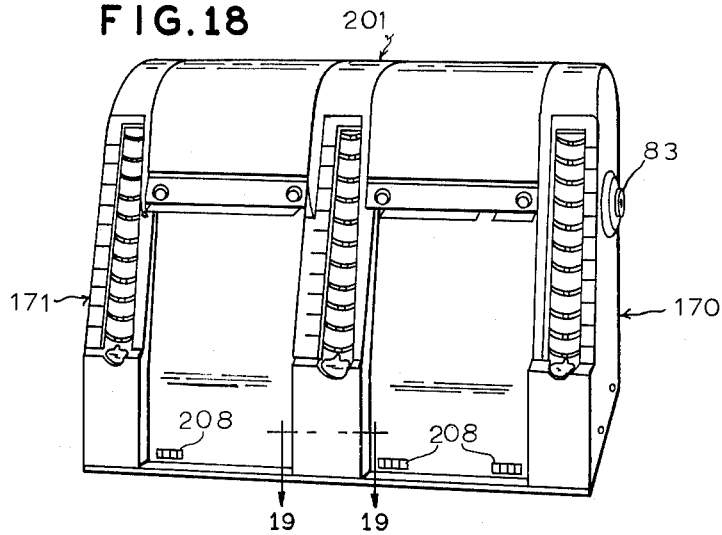
FIG. 18 is a perspective view showing a machine adapted to dispense stamps from three rolls, illustrating the adaptability of the machine for extension of its capacity.

In FIG. 1 the opposite end portions 170, 171 of the housing are shown. The end portion 170 is the right-hand end of the housing as seen in FIG. 1, and while the machine shown in FIG. 18 includes a central section having a sprocket chain thereon corresponding to chains 66, the ends of the housing shown in FIG. 18 are identical in structure to the end portions 170, 171 and are so numbered.

End portion 170 carries the lock 83, and the key actuated rotary portion 174 of the lock is formed with an end recess in which the flat end 175 of the locking rod 82 releasably extends. By this structure the end portion 170 can readily be detached from the central portion of the machine, as will later be described, but only after the key actuated lock 24 is unlocked.

The end 170 of the housing includes an end wall 176 (FIG. 1) that is parallel with plates 2, 3, and with the outline of plates 2, 3. A flange 177 extends at a right angle to the end wall 176 toward the plate 2 that is adjacent thereto, and is rabbetted at 178 along the outer surface of the free edge thereof to receive the marginal portion of the central housing section 19 and the marginal portion of panel 9, while the portion of the flange 177 may slightly overlap the side marginal portions of the front panel 9.

The front portion of flange 177 is formed with an elongated slot 179 in a depressed portion of the flange extending from end to end of the straight length of the chain support 152, and ten of the finger engageable elements 67 of the chain project through said slot uniform distances outwardly of said depressed portion, so that each of the ten finger engageable elements is easily and comfortably accessible moving said chain downwardly by finger 159.

Along one flat side of the slot 179 are numerical symbols "0" to "100" in units of ten, starting from the lower end of the slot 179 such as "0," "10," "20," etc., each being adjacent to one of the finger engageable projecting members or elements 67. The escapement wheel 57 and member 80 are so related that an element 67 will always be alongside one of the numerals alongside slot 179, and the distance each of the drums 29, 36 will rotate between the movement of member 80 to between each adjacent pair of teeth on the escapement wheel will equal the length of a stamp longitudinally of the strips thereof. The cutter bars 10, 11 are positioned relative to the drums so that a line of cross perforations will be along each of the cutting edges of the bars when the rollers are stationary.

At the lower end of slot 179 is a vertical strip 180 slidably supported against the inner surface of the lower vertical portion of panel 9 between spaced vertical ridges formed on said inner surface for vertical reciprocating movement, and a pin 181 holds the strip between said ridges. Strip 180 is bent rearwardly at its upper end to provide a finger engageable portion 183.

The finger engageable elements 67 on the chain 66 are concave on their upper surfaces along the forward run of chain 66. The concavity being transversely of their lengths, and each is formed with a V-shaped forwardly opening recess 184 at their outer ends or edges. This recess is relatively deep and serves two functions, the minor of which is that it prevents any accumulation of dirt at the bottom of the concave surface of each element, where it would otherwise tend to accumulate dirt.

The other and major function is to enable a pointed projection 185 on the finger engageable portion 183 at the upper end of strip 180 to extend into the recesses 184 and to permit the elements 67 to pass the projection 185. Were the portion 183 to terminate at the outermost end of each portion 67, the finger of the operator would not necessarily engage portion 183 at the lower end of the recess if the finger were pointed generally downwardly. But where the projection 185 extends into the recess it invariably engages projection 185.

The lower end 186 of strip 180 is bent rearwardly to a position engaging the upper surface of one end 187 of a horizontally extending arm, generally designated 188, and a horizontal pivot 189 carried by an upstanding lug rigid on base 1 supports said arm for rocking in a vertical plane. End 187 of arm 188 is the forward end, and the opposite or rearwardly extending end of arm 188 at the rear side of pivot 189 is formed with an upwardly directed hook 190 (FIG. 3). A torsion spring around pivot 189 yieldably urges the forward end 187 of the arm 188 upwardly to hold the upper end portion 183 of strip 180 elevated above the lower end of slot 179.

When finger 153 reaches the lower end of the slot 179, and opposite to the symbol "0" upon a downward pull on one of the elements 67 the finger will have engaged the upper end portion 183 and moved it downwardly to elevate hook 190 into a position 191 (FIG. 3) engaging the leading surface of one of the elements 67, thus preventing the chain from moving under the influence of inertia developed by moving the chain by the finger. Immediately upon the finger 153 being lifted, the arm 188 will be restored to the full line elevated position shown in FIG. 3.

FIG. 17 is a greatly reduced fragmentary elevational view and shows a screw 192 that extends through end wall 176 and is threadedly engaged into a spacer nut, such as indicated at 7 (FIG. 3) that, in turn, is threaded onto tie bolt 6. A similar screw (not shown) extends through end wall 176 and into an upper spacer nut not shown in FIG. 3 along the rear wall of the machine. Inasmuch as these screws are readily accessible from outside the machine, were no other means provided for securing each of the end portions 170, 171 to the central housing section, anyone having a screwdriver could readily remove lock 83, and while this would not provide for direct access to the rolls of stamps themselves, it would enable dispensing the stamps.

However, as seen in FIG. 11, a bolt 195 extends through end wall 176 and the wall 2 adjacent thereto, which bolt has a head with a smooth rounded outer surface 195; and serrated inner annular surface 196 as well as a serrated shank. The latter is a relatively tight fit in the opening in wall 176 through which it extends, so when nut 197 is tightened against plate 2, the surface 195 will be flush at its edges with the outer surface of wall 176 and no purchase can be had that will rotate it. Consequently until access is had to nut 197, the bolt cannot be removed. The central housing portion 19 must be unlocked and removed before access can be had to either of the nuts 197, since a corresponding bolt secures the end portion 171 to the outermost plate 3. This is an important feature for the reason that access to the parts enclosed within the end portions 170, 171 without dismantling any of said parts or any of the parts within the central housing portion enables easy and economical maintenance of the machine. By the same token, access to the portion within the central housing portion without opening or removing the end housing portions enables easy and rapid replacement of rolls.

Figure 19:
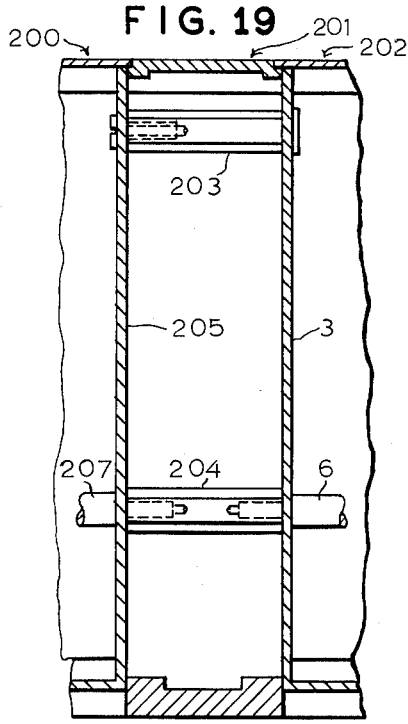
FIG. 19 is an enlarged, cross sectional view taken along line 19—19 showing the manner of connecting the two separate sections illustrated in FIG. 18.

FIG. 18 is an example of the advantages of the structure for the end portions 170, 171. Either of these end portions may be removed and replaced by a section 201 that is of the same structure as the removed end portion, except that it does not carry an end wall, but merely the flange portion, and the free opposite edges of the section 201 are adapted to engage another unit, such as indicated at 202. Thus end portions 170, 171, as seen in FIG. 18 will again be positioned at the outermost ends of the pair of units to provide a machine adapted to carry a third roll of stamps. Spacer nuts 203, 204 as seen in FIG. 19 secure the end plates 3, 205 that correspond to plates 2, 3, together and additional tie bars 207 perform the same function with respect to the newly added unit, as the tie bars 6. In FIG. 18, it is seen that the right hand unit is the same as in FIG. 1 and the left hand unit has been added. Obviously even more units may be added.

In all forms of the invention, reading openings 208 (FIGS. 1, 18) are provided for reading the counters actuated by operation of the several stamp dispensing mechanisms.

I claim:

1. In a stamp dispenser that includes a stamp engaging drum over which a strip of stamps is adapted to extend in a positive driving connection therewith for dispensing the stamps of said strip upon rotation of said drum in one direction, and a first wheel coaxial with said drum having an endless element extending over and in driving relation with said first wheel for effecting rotation of said first wheel in said one direction upon movement of said element in one direction, and finger engageable means connected with said element for so moving the latter by movement of a finger engaging said finger engageable means;

(a) yieldable means operatively connecting said first wheel with said drum for yieldably transmitting the rotary movement of said first wheel in said one direction thereof to said drum and strip where the latter is in said engagement with said drum, for rotating said drum in said one direction under the influence of said finger, to thereby prevent breakage of such strip due to abrupt starting of said element for effecting movement of the latter to so rotate said first wheel and drum;

(b) spaced engageable stop means respectively rigid with said drum and with said first wheel supported for movement into positive driving relation with each other for rotation of said first wheel and said drum as a unit in said one direction after a predetermined degree of movement of said sprocket wheel and said drum in said direction under the influence of said yieldable means.

2. In a stamp dispenser as defined in claim 1:

(c) releasable holding means for positively holding said drum at all times against rotation thereof in either of two opposite directions under a rotative force applied to said drum independently of actuation of said element and said first wheel.

3. In a stamp dispenser as defined in claim 2:

(d) releasing means actuated for movement solely by movement of said element in said one direction thereof for releasing said holding means from holding said drum against said movement of the latter in said one direction only, (e) said holding means including a toothed wheel coaxial and rigid with said drum for movement therewith in said one direction, the teeth of said toothed wheel being equally spaced therearound, and a member supported for movement under the influence of movement of said toothed wheel to and from a position between successive teeth on said toothed wheel only when said drum and said toothed wheel are rotated in said one direction by finger actuation of said element, and for holding said toothed wheel against rotation at all times in said direction that is opposite to said one direction, and yieldable means in yieldable engagement with said member for yieldably urging said member into the space between successive teeth on said toothed wheel, to thereby yieldably hold said toothed wheel in a position in which said member is between one of the adjacent pairs of teeth on said toothed wheel upon cessation of movement of said element.

4. In a stamp dispenser that includes a stamp engaging drum over which a strip of stamps is adapted to extend in positive driving connection therewith for dispensing the stamps of said strip upon rotation of said drum in one direction, a sprocket wheel coaxial with and connected with said drum, said sprocket having an endless sprocket chain extending over and in driving relation with said sprocket wheel for effecting rotation of said sprocket wheel and driven in one direction upon movement of said chain in one direction, and finger engageable means on said chain for so moving the latter by movement of a finger engaging said finger engageable means, and said chain including means thereon for obstructing movement of such finger therethrough:
 (a) holding means for positively holding said drum at all times against rotation thereof in either of two opposite directions under a rotative force applied to said drum independently of actuation of said sprocket wheel;
 (b) releasing means actuated for movement solely by movement of said chain in said one direction thereof for releasing said holding means from so holding said drum against movement of the latter in said one direction only, whereby said drum will be held at all times against rotation in a direction opposite to said one direction.

5. In a stamp dispenser as defined in claim 4:
 (c) said holding means including a toothed wheel coaxial and rigid with said drum for movement therewith in said one direction, the teeth of said wheel being equally spaced therearound, and an element supported for movement under the influence of movement of said toothed wheel to and from a position between successive teeth on said wheel only when said drum and toothed wheel are rotated in said one direction by finger actuation of said chain, and for holding said toothed wheel against rotation at all times in said direction that is opposite to said one direction thereof.

6. In a stamp dispenser as defined in claim 4:
 (c) said sprocket chain having corresponding links pivotally connected together;
 (d) said releasing means including projections equally spaced along and connected to the links of said chain for movement in a path of travel parallel with that of said chain upon said movement of the latter, and in a position for successively engaging and actuating said holding means for intermittently moving said holding means out of drum holding position,
 (e) and means yieldably connected with said holding means for yieldably returning the latter to drum holding position upon movement of each of said projections therepast.

7. In a stamp dispenser that includes a stamp engaging drum over which a strip of stamps is adapted to extend in a positive driving connection therewith for dispensing the stamps of said strip upon rotation of said drum in one direction, and a sprocket wheel coaxial with said drum having an endless sprocket chain extending over and in driving relation with said sprocket wheel for effecting rotation of said sprocket wheel in said one direction upon movement of said chain in one direction, and finger actuatable means on said chain for so moving the latter by movement of a finger engaging said finger engageable means;
 (a) a stationary frame member,
 (b) a shaft rotatably supported by said frame member projecting to opposite sides thereof;
 (c) said drum being secured on said shaft at one side of said frame member and said sprocket wheel being coaxial with said drum and rotatably supported on said shaft at the opposite side of said frame member;
 (d) yieldable means operatively connecting said sprocket wheel with said shaft for yieldably absorbing the starting load of said drum upon actuation of said chain for rotating said sprocket wheel;
 (e) a toothed wheel secured on said shaft for rotation with said drum in the same direction as the latter when said chain is finger actuated for rotating said drum in said one direction thereof, said toothed wheel having equally spaced teeth therearound;
 (f) drum holding means to and from a position in successive spaces between adjacent pairs of teeth on said toothed wheel for holding said drum against rotation when said drum holding means is in one of said spaces;
 (g) supporting means supporting said holding means for said movement of the latter into and out of said spaces;
 (h) yieldable means reacting between said frame and said supporting means for moving the latter yieldably holding said holding means in one position relative to said frame, between an adjacent pair of teeth on said toothed wheel wherever the latter is stationary, and
 (i) releasing means engageable with and actuated for movement by movement of said chain for successively moving said holding means from between said adjacent pairs of teeth on said toothed wheel to thereby permit rotation of said drum under the influence of said movement of said chain.

8. In a stamp dispenser that includes a horizontal base, a housing over said base having opposite vertical end walls generally vertically extending side walls and a top wall cooperating with said base to provide an enclosure for the stamps to be dispensed and the stamp dispensing mechanism, a pair of vertically disposed plates in opposed relation to said end walls rigidly secured to said base horizontally spaced from each other and from said end walls providing a central compartment within said housing between said plates and opposite end compartments, said side and top walls of said housing including flanges on said opposite end walls respectively extending to said plates, and separable from the side and top walls of said central compartment and from said base, means within said central compartment for supporting a pair of rolls of stamps to be dispensed and a pair of stamp dispensing drums, and separate drum actuating mechanisms respectively in said end compartment supported on said plates and separate from said end walls and flanges thereon connected with each of said drums for rotating the latter to dispense stamps from said rolls, the improvement that comprises:
 (a) key actuable locking means in said end compartments fully enclosed within said housing movable to and from positions respectively locking and releasing said drum actuating mechanisms for actuation of the latter;
 (b) a first key actuated lock on one of said end walls accessible to a removable key from outside said one of said end walls for actuation thereof, and means for releasably connecting said lock with said locking means for actuation of the latter to lock and unlock said drum actuating mechanisms upon actuation of said lock by said key;
 (c) a second key actuated lock accessible to a removable key from outside said housing on one of the walls of said central compartment and locking means within said central compartment connected with said second key actuated lock for releasably locking said side and top walls of said central compartment against removal from said base; and (d) releasable means connected with one of the walls of said end compartment against removal from said base and from said plates, said releasable means being accessible for release of the walls of said end compartments from within said central compartment only, whereby release of the walls of said end compartments is dependent upon the removal of the walls of said central compartment for obtaining access to said releasable means.

9. In a stamp dispenser as defined in claim 8:
(e) said releasable means comprising bolts respectively extending through said end walls and through the vertical plate adjacent thereto and a removable nut threadedly held on the end of each bolt within said central compartment, and means respectively on each end wall and each bolt holding each bolt against rotation thereof relative to each end wall and nut.

10. In a stamp dispenser having a single horizontal base, a pair of vertically disposed horizontally spaced, opposed plates rigid with and extending upwardly from said base; a central housing portion extending between said plates and over the central portion of said base providing a front wall, rear wall and a top wall with said front and rear walls extending upwardly from said base; and end housing portions respectively at oppositely outwardly sides of said pair of plates each having a vertical end wall in spaced opposed relation to the plate adjacent thereto:
 (a) a pair of roll supporting means substantially on said base within said central housing portion for supporting a pair of rolls of stamps in side by side relation with their axes normal to the planes of said plates;
 (b) a pair of coaxial stamp dispensing drums respectively spaced above said pair of roll supporting means;
 (c) partition means rigid with said base supported thereon between said pair of drums and said pair of roll supporting means providing a vertical partition within said central housing portion;
 (d) a pair of coaxial horizontal shafts on each of which one of said drums is secured for rotation therewith and means on said partition means and on each of said pair of plates rotatably supporting each shaft for rotation thereof;
 (e) manually actuable means within each of said end housing portions connected with said respective shafts for rotating each shaft and the drum thereon upon manual actuation of said manually actuatable means;
 (f) separate guide means adjacent to said rear wall of said central housing portion and below said top wall for guiding a strip of stamps from a roll thereof in each roll supporting means directly upwardly and over said rolls and along the inner side of said front wall to a discharge opening provided in said front wall for discharge of the stamps on each such strip, and discharge openings formed in said front wall for such discharge of stamps, said drums each having positive strip engaging means for positively moving each such strip from each roll to and through said discharge openings;
 (g) a pair of horizontally disposed curved partitions within said central housing portion and respectively between said partition means and one of said vertical plates of the pair thereof extending from a point adjacent to said rear wall substantially to said base and between each of said roll supporting means and the drum thereover providing a smooth surface facing a roll adapted to be positioned in each roll supporting means and said drum and providing a partition to prevent dust and particles of said strip from falling into said roll supporting means.

11. In a stamp dispenser as defined in claim 10:
(h) each of said last mentioned partitions being of sheet spring material bowed under tension to form the curve thereof, and means for releasably holding each partition at its ends under said tension with the concave side of each partition facing each of said roll supporting means;
(i) the rear wall of said housing being removable from said base and means for releasably locking said rear wall of said central housing portion to said base, and each of said roll supporting means and each of said partitions being removable from said central portion through the rear side of the latter upon removal of said rear wall.

12. In a stamp dispenser that includes a frame and a drum having a circumferentially continuous outer cylindrical surface rotatably supported on said frame for rotation about a horizontal axis, and over substantially the upper half of said drum a strip of stamps from a roll thereof is adapted to extend in positive driving connection therewith for dispensing the stamps of said strip upon rotation of said drum in one direction, and movable, manually actuatable means on said frame operatively connected with said drum for rotating the latter in said one direction upon manual actuation of said last mentioned means for so dispensing stamps:
 (a) pair of annular axially spaced rows of radially outwardly projecting pins rigid with said drum having pointed outer ends for extending through said strip to provide said positive driving connection with the latter;
 (b) an annular, radially outwardly opening circumferentially continuous groove formed in the outer cylindrical surface of said drum having oppositely facing sides spaced between said rows;
 (c) an arcuately formed hold-down plate having substantially the same curvature as said outer cylindrical surface of said drum supported in a hold-down position over the uppermost surface of said drum and having a radially inwardly facing surface in opposed relation to and following said outer cylindrical surface of said drum;
 (d) said radially inwardly facing surface being formed to provide a pair of radially inwardly opening grooves parallel with said rows of pins and into which said pins extend with the portions of said inwardly facing surface at opposite sides of said grooves spaced from the outer cylindrical surface of said drum at opposite sides of each row of said pins a distance only slightly greater than the thickness of said strip, and the bottom of said groove extending over and spaced outwardly of the pointed ends of said pins.
 (e) means for supporting said roll of stamps below said drum with such strip extending upwardly therefrom to and over said upper half of said drum.

13. In a stamp dispenser that includes a frame and a drum rotatably supported on said frame for rotation about a horizontal axis, and over which drum a strip of stamps from a roll thereof is adapted to extend in driving connection therewith for dispensing the stamps of said strip upon rotation of said drum in one direction, and movable, manually actuatable means on said frame operatively connected with said drum for rotating the latter in said one direction upon manual actuation of said means for so dispensing stamps:
 (a) means operatively connecting said manually actuatable means with said drum including a pair of wheels respectively connected with said drum and with said manually actuatable means, and a flexible endless driving element connecting said wheels;
 (b) control means coaxial with said drum including a member adjacent to the wheel of said pair that is connected with said drum having an annular row of radially outwardly projecting teeth thereon, and means carried by said frame yieldably supported thereon for generally radial movement relative to the axis of said drum into and out of position between adjacent pairs of said teeth upon rotation of said element for yieldably holding said drum stationary in predetermined positions corresponding to the spacing between adjacent pairs of said teeth.

14. In a structure as defined in claim 13:
  (c) said member being rotatable with said drum in the same direction as said one direction; and
  (d) said control means including means associated with said member for preventing rotation of said member in a direction the reverse of said one direction.

15. In a stamp dispenser that includes an outer housing, a frame within said housing and a horizontally disposed stamp dispensing cylindrical drum supported on said frame for rotation about a horizontal axis and means on said drum projecting radially outwardly therefrom for positive driving engagement with a strip of stamps adapted to extend across the upper side of said drum in engagement therewith for dispensing said stamps upon rotation of said drum in one direction, and said housing being separable from said frame, the improvement comprising:
  (a) a first wheel at one end of said drum coaxial therewith and rigid with said drum, and a manually actuatable elongated flexible endless driving element extending over said wheel in driving engagement therewith for rotating said drum in said one direction upon actuation of said element for movement longitudinally thereof;
  (b) a toothed wheel coaxial with said first wheel, and connected with the latter for rotating with the latter in said one direction, and having radially outwardly projecting teeth thereon equally spaced from each other circumferentially of said toothed wheel distances respectively equal to approximately the length of each stamp to be dispensed;
  (c) a member supported on said frame for swinging movement to a position between successive pairs of adjacent teeth on said toothed wheel upon rotation of said drum in said one direction;
  (d) yieldable means yieldably urging said member to a position between the teeth of said adjacent pairs for tending to yieldably hold said first wheel and said drum against rotation by the yieldable resistance of said yieldable means;
  (e) rotatable locking means rotatably supported on said frame rotatable from a locking position positively holding said yieldable means against movement in a direction for releasing said member from a locking position between and adjacent pair of said teeth thereby rendering said yieldable means inoperative for yielding to enable rotation of said toothed wheel, to a released position releasing said member for movement to between successive pairs of adjacent wheels upon rotation of said toothed wheel; and
  (f) a key actuatable lock carried by said housing for removal from said frame and from said locking means upon removal of said housing from said frame.

References Cited by the Examiner

UNITED STATES PATENTS

| | | | |
|---|---|---|---|
| 414,403 | 11/1889 | Grimes | 226—129 |
| 2,652,115 | 9/1953 | Mysels | 225—16 |
| 3,116,000 | 12/1963 | Wales | 226—76 |
| 3,168,230 | 2/1965 | Fahrenbach | 226—135 X |

M. HENSON WOOD JR., *Primary Examiner.*

Disclaimer

3,255,941.—*Richard A. Edwards*, Walnut Creek, Calif. STAMP DISPENSER. Patent dated June 14, 1966. Disclaimer filed May 2, 1969, by the assignee, *Roto-Stamp Corporation*.
Hereby enters this disclaimer to claims 12, 13 and 15 of said patent.
[*Official Gazette October 14, 1969.*]

Disclaimer 3,255,941.—*Richard A. Edwards*, Walnut Creek, Calif. STAMP DISPENSER.
Patent dated June 14, 1966. Disclaimer filed Dec. 15, 1969, by the assignee, *Roto-Stamp Corporation*.
Hereby enters this disclaimer to claim 14 of said patent.
[*Official Gazette March 31, 1970.*]